(12) United States Patent
Boyle et al.

(10) Patent No.: US 8,092,203 B2
(45) Date of Patent: Jan. 10, 2012

(54) WINDSHIELD REPAIR

(75) Inventors: Michael P. Boyle, Bend, OR (US); Randy L. Mackey, Bend, OR (US); Christopher M. Boyle, Bend, OR (US)

(73) Assignee: Glas Weld Systems, Inc., Bend, OR (US)

( * ) Notice: Subject to any disclaimer, the term of this patent is extended or adjusted under 35 U.S.C. 154(b) by 265 days.

(21) Appl. No.: 12/262,011

(22) Filed: Oct. 30, 2008

(65) Prior Publication Data

US 2009/0108482 A1 Apr. 30, 2009

Related U.S. Application Data

(60) Provisional application No. 60/984,314, filed on Oct. 31, 2007.

(51) Int. Cl.
*B29C 73/24* (2006.01)
(52) U.S. Cl. .......................................... 425/12; 425/13
(58) Field of Classification Search ............... 264/36.21; 425/12, 13
See application file for complete search history.

(56) References Cited

U.S. PATENT DOCUMENTS

| | | | |
|---|---|---|---|
| 4,569,808 A * | 2/1986 | Smali | 264/36.21 |
| 4,919,602 A | 4/1990 | Janszen | |
| 5,670,180 A * | 9/1997 | Mackey et al. | 425/11 |
| 6,042,353 A | 3/2000 | Thomas et al. | |
| 6,485,281 B1 * | 11/2002 | Curl | 425/12 |
| 2002/0058080 A1 * | 5/2002 | Curl | 425/12 |
| 2005/0238743 A1 | 10/2005 | Wanstrath | |

FOREIGN PATENT DOCUMENTS

| | | |
|---|---|---|
| JP | 07-137154 A | 5/1995 |
| JP | 2006-187897 A | 7/2006 |

* cited by examiner

*Primary Examiner* — Joseph Del Sole
*Assistant Examiner* — Kimberly A Stewart
(74) *Attorney, Agent, or Firm* — Schwabe, Williamson & Wyatt

(57) ABSTRACT

Embodiments of the present disclosure provide methods, apparatuses, and systems for repairing of abnormalities such as cracks and/or breaks in substrates such as glass and/or plastics.

18 Claims, 4 Drawing Sheets

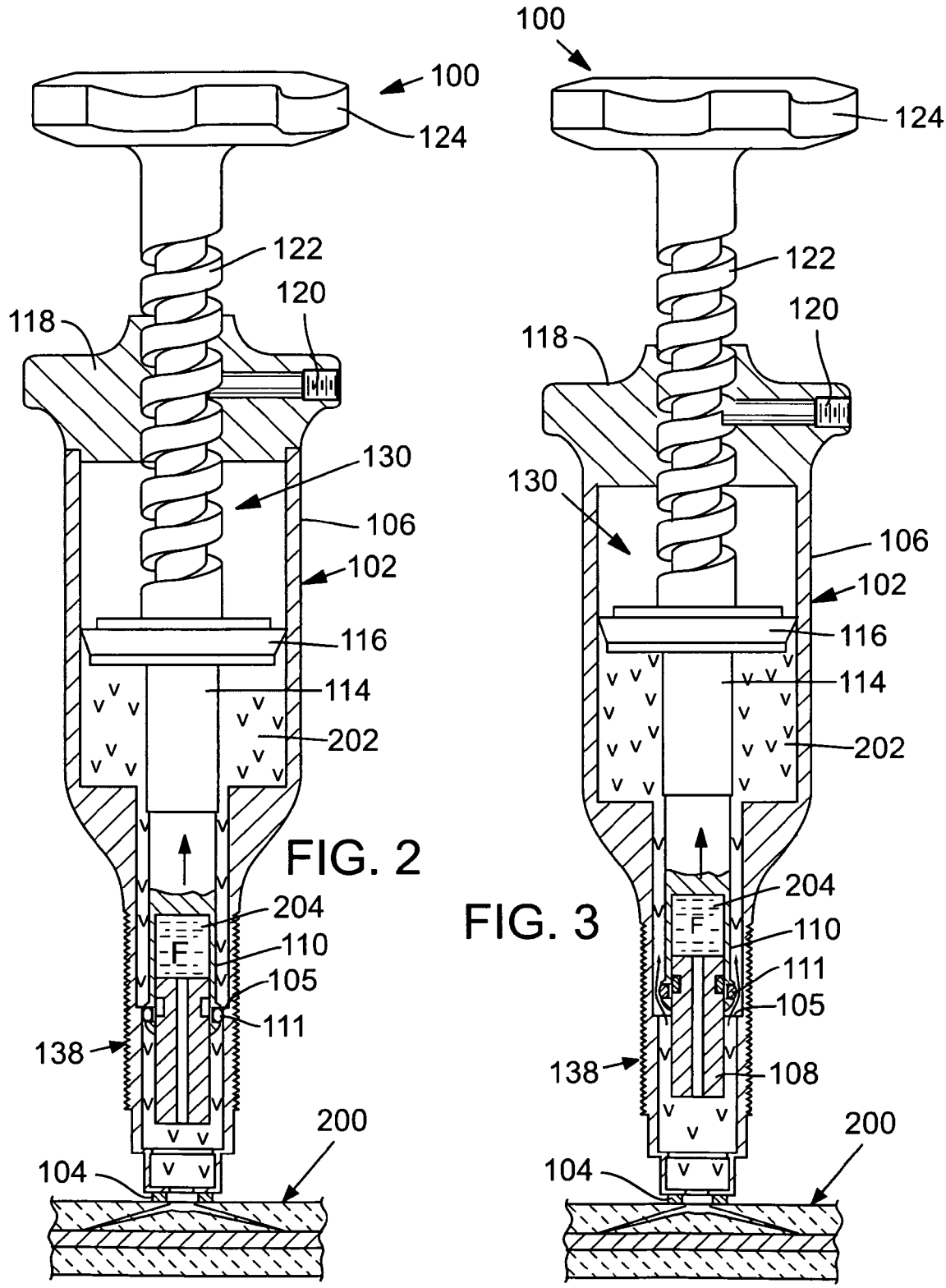

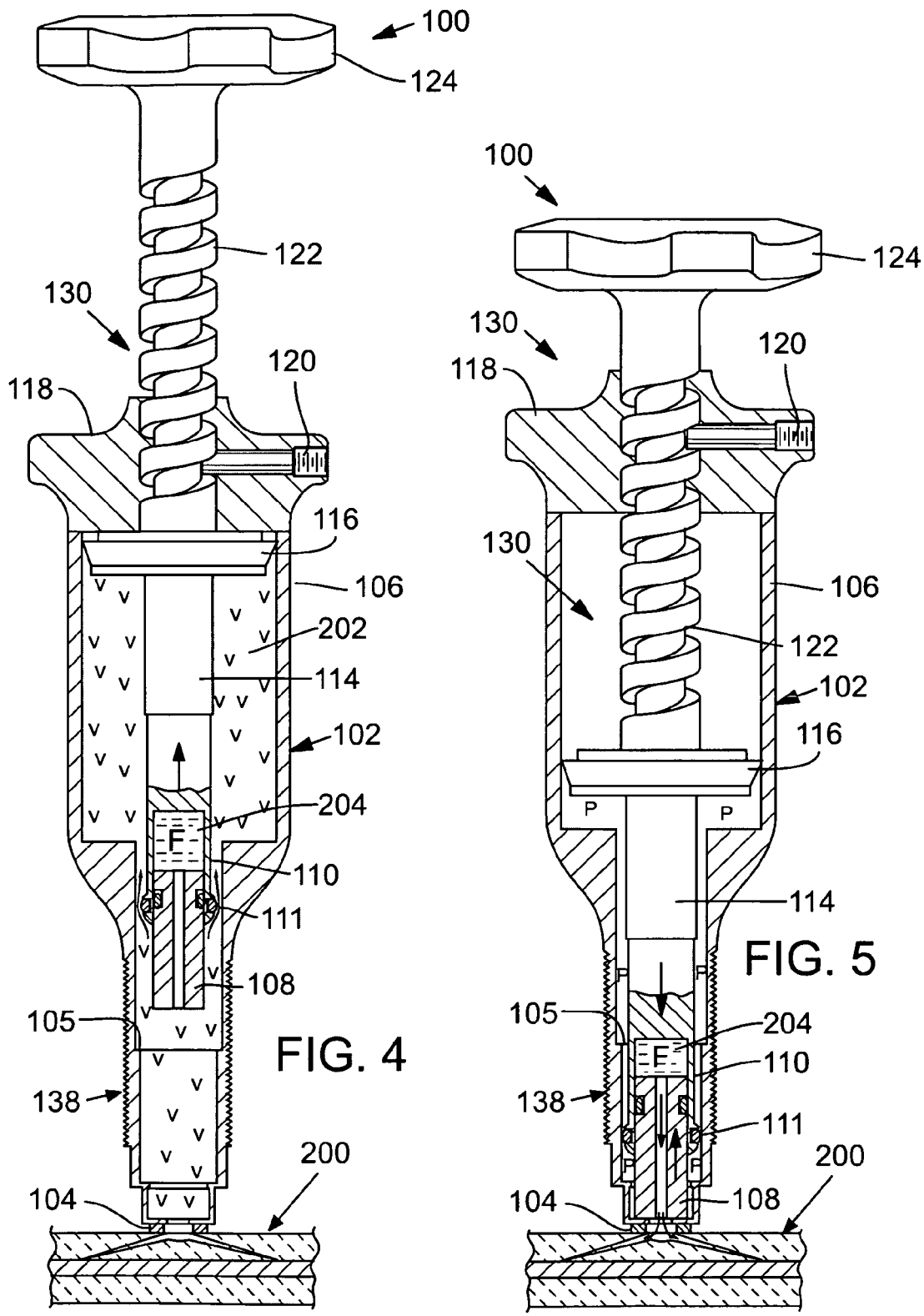

WINDSHIELD REPAIR

CROSS REFERENCE TO RELATED APPLICATIONS

The present application claims priority to U.S. Provisional Patent Application No. 60/984,314, filed Oct. 31, 2007, entitled "Windshield Repair." The specification of the application is hereby incorporated by reference in its entirety for all purposes, except those sections, if any, that are inconsistent with this specification.

TECHNICAL FIELD

Embodiments of the present disclosure relate to the field of substrate repair, and more particularly to repairing and/or containing breaks in glass and/or plastic, such as windshields.

BACKGROUND

Substrates such as glass, plastic, and others are typically used in a variety of manners, for example, in automobile windshields. Typically, a windshield contains two curved sheets of glass with a plastic, energy-absorbing layer placed between them. When damage occurs to the windshield, for example by a rock or object striking the windshield, various contaminants including air and moisture may become trapped between the two layers of glass. The contaminants may alter the refractive index of the windshield thereby obscuring or impeding the vision of a driver. These effects may increase as the contaminants react with varying environmental conditions, for example increasing or decreasing temperatures.

The repair and/or containment of such irregularities may be accomplished by filling the damaged site with clear resin or an epoxy type chemical. A general goal is to remove the contaminants and fill the damaged site with a material having a substantially similar refractive index to the outer layers of glass. This may stop the refraction of light and prevent further damage to the windshield or substrate.

Various systems currently being used to cure these irregularities create a vacuum on the substrate to evacuate the air and/or contaminants from the damaged site. The vacuum is typically provided by external sources. These external vacuum sources, in addition to increasing the cost of the repair system, often increase the complexity of the repair system. For instance, the use of external vacuum sources may require direct conduits from the external vacuum source to the damaged site or irregularity. Because of a need for a hermetically sealed environment, these conduits may require additional materials such as seals that are typically susceptible to degradation as a result of time and repeated use. If a seal is not properly obtained, the vacuum may fail to evacuate the containments from the damaged site.

Various ones of these systems may also provide a vacuum which evacuates contaminates directly through the filling material that is to be inserted into the irregularity. In such instances, contaminates such as, but not limited to, moisture, air, and/or other particles may contaminate the filling material. These contaminates may alter the refractive index of the material and/or allow air and moisture to remain within the damaged site. Furthermore, by inducing the vacuum through the filling material, the rate at which the one or more contaminates may be removed from the irregularity may be impeded.

Thus, it has been found that many of the inefficiencies surrounding the repairing of glass or plastic substrates, such as windshields, often relates to the creation and application of a vacuum and the application of a filling material. Applicants have developed techniques and apparatuses to improve the repairing process such that the creation and application of the vacuum may be maximized without substantially impacting the refractive index of the material to fill the irregularity.

BRIEF DESCRIPTION OF THE DRAWINGS

Embodiments of the present disclosure will be readily understood by the following detailed description in conjunction with the accompanying drawings. Embodiments of the disclosure are illustrated by way of example and not by way of limitation in the figures of the accompanying drawings.

FIG. 2 illustrates a perspective view of the substrate repairing apparatus in accordance with various embodiments;

FIG. 3 illustrates a perspective view of the substrate repairing apparatus in accordance with various embodiments;

FIG. 4 illustrates a perspective view of the substrate repairing apparatus in accordance with various embodiments;

FIG. 5 illustrates a perspective view of the substrate repairing apparatus in accordance with various embodiments.

DETAILED DESCRIPTION OF EMBODIMENTS

Figure 1:
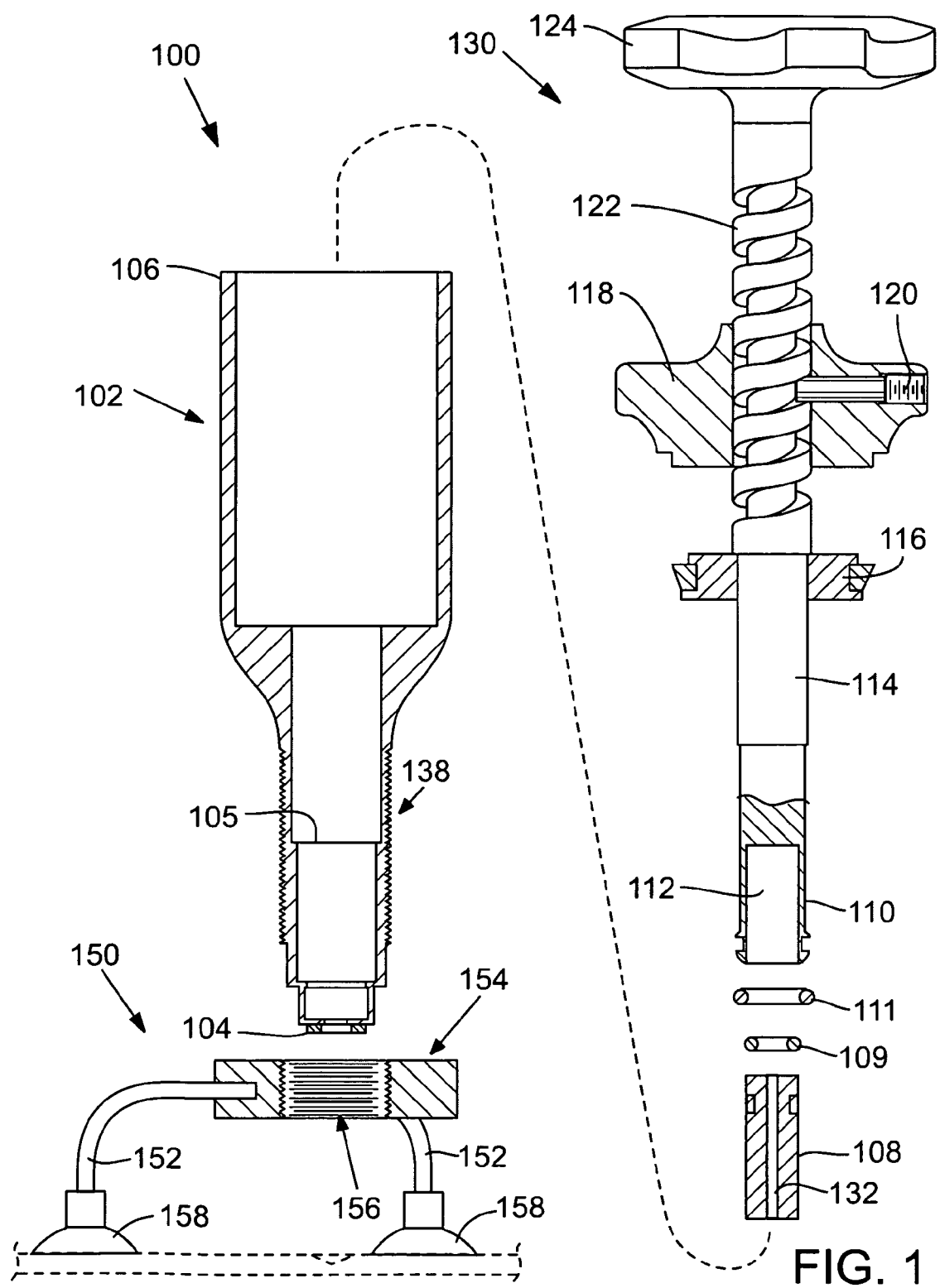
FIG. 1 illustrates an exploded view of the substrate repairing apparatus in accordance with various embodiments.

In the following detailed description, reference is made to the accompanying drawings which form a part hereof, and in which are shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present disclosure. Furthermore, for the purposes of the description, a phrase in the form "A/B" means A or B; and a phrase in the form "A and/or B" means "(A), (B), or (A and B)".

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

In various embodiments of the present disclosure, methods, apparatuses, and systems for repairing substrates such as windshields are provided. In various embodiments, a vacuum may be created to evacuate one or more contaminants from a damaged site. During the evacuation of the contaminants, the material to fill the damaged site, e.g. resin, may be contained within a holding chamber isolated from the various contaminates. Subsequent to the evacuation, the material to fill the damaged site may be disposed on the damaged site and into the irregularity. Such may allow for improved application of the vacuum and material to the irregularity.

Various embodiments may include a windshield repairing apparatus including a piston assembly adapted to dispense a substrate repairing substance, a holding chamber coupled to a distal end of the piston assembly adapted to facilitate isolation of the substrate repairing substance from one or more contaminants evacuated from a damaged substrate, and a holding chamber piston coupled to the holding chamber to facilitate application of the substrate repairing substance to the damaged substrate. In this manner, a windshield repairing device may be utilized to evacuate contaminates from a damaged substrate without contaminating the resin, and selectively apply the uncontaminated resin to the damaged substrate. It should be understood that while this application may refer to windshields or glass throughout the specification, the teachings and embodiments provided herein may equally apply to other substrates, for example, plastics. The disclosure is not to be limited in this regard.

Referring to FIG. 1, an exploded view of a repairing apparatus in accordance with various embodiments is illustrated. Repairing apparatus 100 may include a casing 102 adapted to couple to a piston assembly 130. The casing 102 may include a seal 104 and a threaded opening 106 (threads not illustrated) to engage the corresponding threads of a cap 118 (threads not shown) of the piston assembly 130. Additionally, the casing 102 may include one or more graduated steps 105 within the casing to facilitate application of a vacuum. The piston assembly 130 may include a handle 124, a cap 118 having a piston assembly engager 120, a piston advancement mechanism 122, a vacuum seal 116, a piston 114, a holding chamber 110 to hold substrate repairing substance 112, and a holding chamber piston 108. Additionally, in various embodiments, repairing apparatus 100 may include a holder 150. The holder 150 in various embodiments may include two or more legs 152 extending from a central hub 154 having a central bore 156. In various embodiments, the legs 152 may be coupled to suction cups 158. The various components of the repairing apparatus 100 may be manufactured out of various materials including but not limited to metals, plastics, ceramics, rubbers, pvc and/or other materials. The disclosure is not to be limited in this regard.

In various embodiments, casing 102 may be a generally cylindrical shaped casing. The generally cylindrical shaped casing 102 may include an upper cylinder portion having a first diameter and a lower cylinder portion having a second diameter. The diameters of each the upper and lower cylinder portions may vary depending on, for example, the size of the irregularity to be repaired and/or contained. In various embodiments, casing 102 may include one or more internal steps 105 configured to facilitate application of a vacuum and isolation of a damaged site. In various embodiments, casing 102 may include a plurality of these graduated steps 105 that may be configured to interact with one or more seals 111, 116 of the piston assembly 130 to maintain a vacuum while the piston assembly is advanced toward the damaged substrate. This will be discussed in more detail with reference to the FIGS. 2-4.

In various embodiments, casing 102 may include at least two openings, one at each of its distal ends. In various embodiments, at least one of the openings may be configured to engage a damaged substrate and as engaged provide an isolated internal environment to facilitate generation of a vacuum. In various embodiments, a seal 104 may be disposed at one end and adapted to isolate and/or hermetically seal the inner chamber of casing 102 with a windshield substrate such that the irregularity or abnormality is generally contained within the sealed area. The opening opposite of seal 104 may be adapted to couple with cap 118 of piston assembly 130.

In various embodiments, cap 118 of piston assembly 130 may be adapted to couple to casing 102. Cap 118 may be adapted to be threadably couple to casing 102 through corresponding, interconnecting threads 106 on casing 102. In other embodiments, a variety of coupling mechanisms may be used to couple the piston assembly 130 and cap 118 to the casing 102, for example, one or more set screws. The disclosure is not to be limited in this regard.

A piston assembly 130, in accordance with various embodiments, may include a holding chamber 110 at a distal end. The holding chamber 110 may facilitate isolation of a substrate repairing substance 112 from one or more contaminants evacuated from a damaged substrate, wherein the one or more contaminates are evacuated by vacuum pressure generated in response to movement of the piston assembly 130. This will be discussed in more detail herein. In various embodiments, the holding chamber 110 may define a constant volume in which a substrate repairing substance 112 may be disposed. The opening of the holding chamber 110, in various embodiments, may be configured to interface with a holding chamber piston 108. The holding chamber 110 may also include one or more seals 111 adapted to interface with an inner wall of casing 102 to facilitate generation of a vacuum.

In various embodiments, the substrate repairing substance 112 within holding chamber 110 may be a resin or other epoxy chemical adapted for use in repairing windshields. Other types of substrate repairing substances are contemplated.

In various embodiments, the holding chamber piston 108 may include a seal 109 configured to engage the inner walls of the holding chamber 110 and facilitate isolation of the substrate repairing substance 112 within the holding chamber 110. A holding chamber piston 108, in various embodiments, may couple to the holding chamber 110 via a seal 109 and be configured to displace the substrate repairing substance 112 to facilitate its application to the damaged substrate. For example, in various embodiments, the holding chamber piston 108 may have a first end to displace a portion of the substrate repairing substance 112 at a desired rate. The first end, in various embodiments may include an opening to one or more conduits 132 to direct the substrate repairing substance 112 to the damaged substrate. The opening, in various embodiments, may vary in size to facilitate selective application of the substrate repairing substance 112.

In various embodiments, the holding chamber piston 108 may be configured to displace the substrate repairing substance 112 in response to movement of the piston assembly 130. For example, in various embodiments, as the piston assembly 130 is advanced toward the damaged substrate, the holding chamber piston 108 may be forced against the windshield substrate, or alternatively seal 104, and consequently, into the holding chamber 110. As the holding chamber piston 108 enters the holding chamber 110 it may displace the substrate repairing substance 112.

In various embodiments, the piston assembly 130 may also include a vacuum seal 116 designed to facilitate generation of a vacuum. In various embodiments, the vacuum seal 116 may be a cup seal designed to interact with an inner wall of the casing 102. In various embodiments, the cup seal 116 may be coupled to the piston assembly 130. As the piston assembly 130 is retracted, in various embodiments, the seal 116 may interact with the inner wall of casing 102 in a sliding coaxial manner to facilitate generation of a vacuum to evacuate one or more contaminates from a damaged substrate. While vacuum seal 116 may be used to facilitate generation of a vacuum, other sources of vacuum are contemplated, for example, the use of external vacuum assemblies.

In various embodiments, to affect movement of piston assembly 130, an actuator may be configured to advance and retract the piston assembly 130. In various embodiments, the actuator may be a handle 124 configured to rotate. In various embodiments, handle 124 may be coupled to the piston assembly 130 and include a plurality of threads 122 configured to interact with the cap 118 and a piston assembly engager 120. For example, a piston assembly engager 120 may interact with the threads 122 of the piston assembly 130 to enable the piston assembly 130 to advance and/or retract. In various other embodiments, the piston assembly engager 122 may also be utilized to fasten the piston assembly 130 in a desired position and resist one or more forces generated by the piston assembly 130. In various embodiments, the piston assembly engager 120 may be a set screw. In other embodiments, piston assembly engager 120 may include other devices adapted to facilitate advancement and retraction of a piston assembly 130. The piston assembly 130, in various other embodiments, may include other elements capable of advancing and retracting the piston assembly 130.

In various embodiments, the repairing apparatus 100 may be mounted in a holder 150. In the illustrated embodiment, the holder 150 has two legs 152 that extend from a central hub 154 having a central bore 156. In various embodiments, the legs may be coupled to suction cups 158, wherein the suction cups are configured to couple the holder 150, and consequently the repairing apparatus 100, to the damaged substrate. In various embodiments, the central bore 156 of central hub 154 may include threads configured to engage external threads 138 of casing 102. In this manner, the repairing apparatus 100 may be adjustably mounted in the holder 150 by rotating the device 100. In various other embodiments, the holder 150 may include other clamping mechanisms configured to couple to the repairing apparatus 100 to the damaged substrate. Those of ordinary skill in the art will readily understand that other techniques and/or apparatuses may be readily used without deviating from the scope of the disclosure.

With reference to FIGS. 2-5, various views of a repairing sequence are illustrated in accordance with various embodiments. These sequences, in various embodiments, may begin with loading a repairing substance 112 into a holding chamber 110 of the piston assembly 130. In various embodiments, this may include utilizing various instruments to place a desired amount of the substrate repairing substance 112 in the holding chamber 110. Subsequent to loading the substrate repairing substance 112 into the holding chamber 110, the holding chamber piston 108 may be coupled to the piston assembly 130 via a seal 109 coupling to the inner walls of the holding chamber 110. The repairing apparatus 100 may then be placed into holder 150 and positioned relative to the damaged substrate.

In various embodiments, one or more contaminants may then be removed from the damaged substrate by generating a vacuum within the casing 102. In various embodiments, the vacuum may be generated by retracting a handle 124 coupled to the seal 116 to actuate the seal 116 within the casing 102. In various other embodiments, a vacuum may be generated by an external source.

After the one or more contaminates have been removed, the piston assembly 130, in accordance with various embodiments, may dispose the substrate repairing substance into the damaged substrate via actuation of the holding chamber piston 108, wherein the holding chamber piston includes one or more conduits configured to direct the repairing substance to the damaged substrate. In various embodiments, the piston assembly may dispose the substrate repairing substance 112 by interacting with the substrate and advancing into the holding chamber 110. The holding chamber piston 108 may be advanced by actuation of a handle 124 coupled thereto. In various embodiments, actuation of the handle 124 may enable the disposition of a desired amount of the reparation substance into the irregularity or abnormality. The desired amount, in various embodiments, may be determined based on the size of the irregularity or abnormality to be repaired. Various embodiments will be discussed more thoroughly herein.

Referring now to FIGS. 2 and 3, illustrations of a repairing apparatus 100 are shown in accordance with various embodiments. In the Figures, the repairing apparatus 100 is placed on a damaged substrate 200 with a seal 104 enclosing the damaged site. In various embodiments, the seal 104 may enclose the damaged site and facilitate isolation of the internal environment of the casing 102. With the damaged site hermetically sealed within the casing 102, the handle 124 of the piston assembly may be actuated to retract the piston assembly 130. In various embodiments, as the piston assembly 130 is retracted, a cup seal 116 may engage the casing 102 in a sliding manner to facilitate generation of a vacuum 202. Additionally, a seal 111 coupled to the holding chamber 110 may similarly engage an inner wall of casing 102 to facilitate generation of a second vacuum.

In various embodiments, as illustrated in FIG. 2, the second vacuum may remain independent of the first vacuum created by the cup seal 116 while the seal 111 is in contact with a smaller diameter portion of the cylindrical casing 102. As illustrated in FIG. 3, upon retraction of the piston assembly 130 beyond the smaller diameter portion of the cylindrical casing 102, the first vacuum generated by the cup seal 116 and the second vacuum generated by the seal 111 may combine. In this manner, contaminates from the damaged substrate 200 may be evacuated.

In various embodiments, as illustrated in both FIGS. 2 and 3, as the piston assembly 130 is retracted to facilitate generation of a vacuum 202, a holding chamber 110, and consequently a substrate repairing substance 204 contained therein, may also experience movement. In various embodiments, the holding chamber 110 may isolate the substrate repairing substance 204 from the one or more contaminants evacuated from damaged substrate 200. By isolating the substrate repairing substance 204, in various embodiments, the piston assembly 130 may evacuate the one or more contaminants directly away from the damaged substrate without having to draw them through the substrate repairing substance 204. In various embodiments, this may facilitate generation of the vacuum and evacuation of the contaminants.

Referring to FIG. 4, a view of a repairing apparatus 100 in a fully retracted position is illustrated, in accordance with various embodiments. As illustrated, the piston assembly 130 is in a fully retracted state wherein the cup seal 116 is placed against cap 118. As illustrated, vacuum 202 is present within the casing 102. The vacuum, generated cup seal 116 may facilitate evacuation of one or more contaminants from the damaged substrate 200. In various embodiments, piston assembly 130 may be retracted varying amounts to generate a desired vacuum within casing 102. In various embodiments, indicia on handle 124 may be utilized to indicate the amount of vacuum present within casing 102. For example, in various embodiments, tracking the number of rotations made by handle 124 may indicate an amount of vacuum pressure applied to the damaged substrate. In other embodiments pressure gauges may be used to measure vacuum pressure within casing 102.

Referring to FIG. 5, a view of the repairing apparatus 100 is illustrated in accordance with various embodiments. In various embodiments, as the piston assembly is advanced toward the substrate, the cup seal 116 may facilitate evacuation of the one or more contaminates to the atmosphere. In various embodiments, as seal 111 of the holding chamber 110 comes into contact with the smaller diameter wall of the casing 102, the seal 111 may, in various embodiments, seal the lower section of the casing 102, including the damaged substrate, from the upper cylinder portion including a majority of the one or more contaminates.

In various embodiments, as the piston assembly 130 is advanced further, the holding chamber piston 108 may contact seal 104. In various embodiments, as the seal 104 interacts with the damaged substrate, the seal 104 and the damaged substrate 200 may impose a force on the holding chamber piston 108 opposite the direction of advancement on the piston assembly 130. In various embodiments, this force may direct the holding chamber piston 108 into the holding chamber 110. As the holding chamber piston 108 enters the holding chamber 110, the volume of the holding chamber 110 may decrease thereby forcing the substrate repairing substance out of the holding chamber 110. In various embodiments, one or more conduits 132 in the holding chamber piston 108 may enable the substrate repairing substance to enter the damaged substrate 200.

Figure 6:
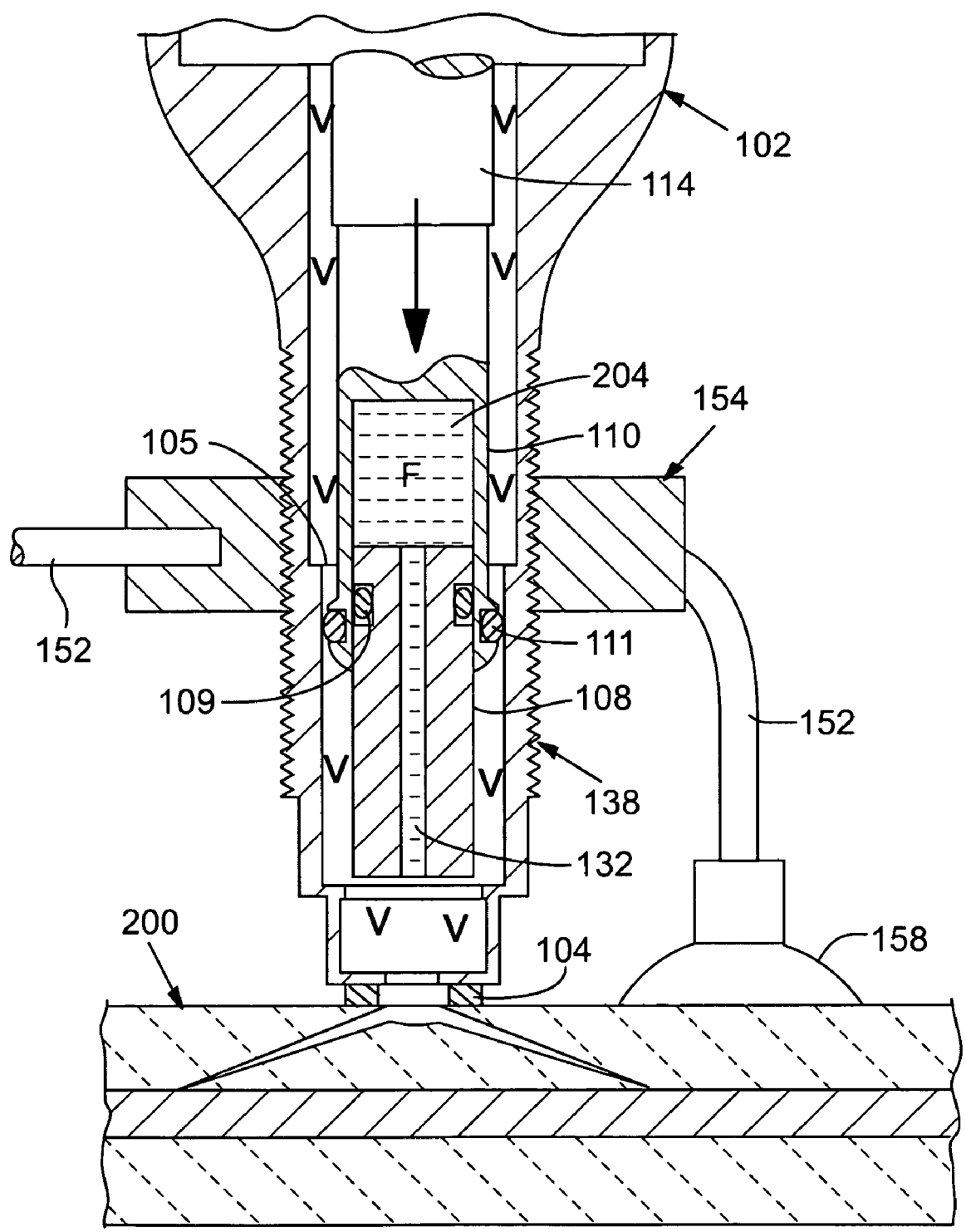
FIG. 6 illustrates a view of a holding chamber and holding chamber piston in accordance with various embodiments.

Referring now to FIG. 6, a view of a holding chamber 110 and a holding chamber piston 108 are illustrated in accordance with various embodiments. In the embodiment, a seal 111 of the holding chamber 110 is in sliding engagement with an inner wall of the casing 102. In various embodiments, this may isolate the damaged substrate from one or more contaminates previously evacuated from the damaged substrate 200. In various embodiments, as the piston assembly 130 is advanced further in the direction of the damaged substrate, the holding chamber piston 108 may come into contact with seal 104. As the piston assembly interacts with the seal 104 and damaged substrate 200, the holding chamber piston 108 may displace the substrate repairing substance 204 in the holding chamber 110. In various embodiments, the holding chamber piston 108 may displace the substrate repairing substance through one or more conduits 132. In various embodiments, this may direct the substrate repairing substance to the damaged substrate and a desired rate, depending on, for example the diameter and/or number of conduits 132.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

What is claimed is:

1. A piston assembly for dispensing a substrate repairing substance comprising:
  a holding chamber coupled to a distal end of the piston assembly, wherein the holding chamber isolates the substrate repairing substance from one or more contaminates evacuated from a damaged substrate; and
  a holding chamber piston coupled to the holding chamber, the holding chamber having an integral conduit, wherein the holding chamber piston is coaxial with and movable within the holding chamber to displace the substrate repairing substance via the conduit.

2. The piston assembly of claim 1, wherein the holding chamber piston is configured to displace the substrate repairing substance in response to movement of the piston assembly, wherein the movement causes the holding chamber piston to interact with the damaged substrate.

3. The piston assembly of claim 1, wherein the holding chamber piston is configured to move in a direction opposite of the piston assembly to displace the substrate repairing substance.

4. The piston assembly of claim 1, wherein the holding chamber piston includes a first end to displace a portion of the substrate repairing substance at a desired rate to facilitate application of the portion to the damaged substrate.

5. The apparatus of claim 1, wherein the holding chamber piston includes one or more seals to facilitate isolation of the substrate repairing substance from the one or more contaminants.

6. The apparatus of claim 1, wherein the holding chamber piston includes one more seals to facilitate isolation of the substrate repairing substance from moisture and air.

7. The apparatus of claim 1, wherein the holding chamber is configured to retain a resin adapted for repairing a windshield.

8. A system comprising:
  a casing having an opening at a distal end, the casing providing an isolated internal environment to facilitate generation of a vacuum; and
  a piston assembly coupled to the casing, wherein the piston assembly comprises:
    a holding chamber coupled to a distal end of the piston assembly, wherein the holding chamber isolated a repairing substance from one or more contaminates evacuated from a damaged substrate; and
    a holding chamber piston removably coupled to the holding chamber, the holding chamber having an intergral conduit, wherein the holding chamber piston is coaxial with and movable within the holding chamber to displace the repairing substance via the conduit.

9. The system of claim 8, wherein the holding chamber piston is configured displace the repairing substance in response to movement of the piston assembly relative to the casing, wherein said movement of the piston assembly forces the holding chamber piston into the holding chamber.

10. The system of claim 8, further comprising:
  an actuator coupled to the piston assembly, wherein the actuator is configured to advance and retract the piston assembly to facilitate generation of the vacuum and to displace the repairing substance.

11. The system of claim 8, further comprising:
  one or more seals coupled to the piston assembly and configured to generate the vacuum in response to movement of the piston assembly.

12. The system of claim 11, wherein the casing includes a plurality of graduated steps configured to interact with the one or more seals to maintain the vacuum while the piston assembly is advanced toward the damaged substrate.

13. The system of claim 8, wherein the holding chamber piston is configured to move in a direction opposite the piston assembly to displace the repairing substance.

14. The system of claim 8, wherein the holding chamber is configured to substantially isolate the repairing substance from contaminants including air and moisture.

15. The system of claim 14, further including an outer seal, coupled to the casing, to facilitate isolation of the internal environment.

16. An assembly for dispensing a substrate repairing substance, the assembly comprising:
  a casing having an upper region and a lower region; and
  a piston assembly coupled to the casing in a coaxial arrangement, the piston assembly having
    a holding chamber at a distal end of the piston assembly,
    a holding chamber piston coupled to the holding chamber,
    a first seal coupled to the piston assembly and located between the piston assembly and the casing and within the upper region of the casing, and
    a second seal coupled to the holding chamber and located between the holding chamber and the casing and within the lower region of the casing.

17. The assembly of claim 16, further comprising a third seal coupled to the holding chamber piston and located between the holding chamber piston and an interior surface of the holding chamber.

18. The assembly of claim 16, wherein the lower region of the casing comprises a first portion in which the second seal is disengaged from an interior surface of the casing and a second portion in which the second seal is engaged with an interior surface of the casing.

* * * * *